US006804260B2

(12) United States Patent
Lioy et al.

(10) Patent No.: US 6,804,260 B2
(45) Date of Patent: Oct. 12, 2004

(54) METHOD FOR SELECTIVELY MAINTAINING AND APPLYING PPP COMPRESSION IN A WIRELESS COMMUNICATION SYSTEM

(75) Inventors: Marcello Lioy, San Diego, CA (US); Nischal Abrol, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 815 days.

(21) Appl. No.: 09/785,349

(22) Filed: Feb. 16, 2001

(65) Prior Publication Data

US 2002/0114343 A1 Aug. 22, 2002

(51) Int. Cl.[7] .............................................. H04L 29/06
(52) U.S. Cl. ...................................... 370/477; 370/342
(58) Field of Search ................................. 370/310, 342, 370/389, 442, 477; 455/70, 72; 709/246, 247

(56) References Cited

PUBLICATIONS

Koodli, et al., "Header Compression State Relocation in IP Mobile Networks", Communication Systems Laboratory, Nokia Research Center, Jul. 2000, pp. 1–12.
V. Jacobson, "Compressing TCP/IP Headers", Feb. 1990, XP–002139708, pp. 1–43.

G. McGregor, The PPP Internet Protocol Control Protocol (IPCP), Network Working Group, May 1992, pp. 1–12.

Primary Examiner—Chi Pham
Assistant Examiner—Derrick W Ferris
(74) Attorney, Agent, or Firm—Philip R. Wadsworth; Charles D. Brown; Thomas M. Thibault (57) ABSTRACT

A method for selectively maintaining compression state and applying a compression technique after a PPP renegotiation on a $U_m$ interface of a wireless communication network. A communication device receives packetized data transmitted from a terminal device, which is coupled to the communication device via an $R_m$ interface. The communication device determines whether the received packetized data comprises compressed or uncompressed data. Upon determining that the received packetized data comprises compressed data, the communication device determines whether connection information identifying a compression slot is included in the compressed data. The communication device further determines whether the connection information exceeds a highest-numbered decompression slot from a plurality of decompression slots on said $U_m$ interface. The communication device sets up a local decompression slot, in the communication device, which corresponds to the connection information in order to maintain said compression state, wherein the local decompression slot is set up in response to determining that the connection information exceeds the highest-numbered decompression slot. The communication device decompresses the compressed packetized data when it receives compressed packetized data containing said connection information.

24 Claims, 6 Drawing Sheets

FIG. 4B

METHOD FOR SELECTIVELY MAINTAINING AND APPLYING PPP COMPRESSION IN A WIRELESS COMMUNICATION SYSTEM

BACKGROUND OF THE INVENTION

1. Field of the Invention

This invention generally relates to the field of wireless communications. More particularly, the present invention relates to a novel method for determining when to maintain a compression state and efficiently applying compression techniques on a wireless communication device.

2. Description of Related Art

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. A crucial part of meeting these demands and providing users with the necessary support is the use of Code Division Multiple Access (CDMA) technology in wireless communication systems.

CDMA is a digital radio-frequency (RF) channelization technique defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Other standards describing CDMA operations include TIA TR45.5. The CDMA2000 ITU-R RTT Candidate Submission, approved May 15, 1998 and Third Generation Partnership Project—Technical Specification Group—Radio Access Network/Radio Interface Protocol Architecture, Release 99, both of which are incorporated by reference. Wireless communication systems employing CDMA technology assign a unique code to communication signals and spread these communication signals across a common (wideband) spread spectrum bandwidth. As long as the receiving apparatus in a CDMA system has the correct code, it can successfully detect and select its communication signal from the other signals concurrently transmitted over the same bandwidth. The use of CDMA produces an increase in system traffic capacity, improves overall call quality and noise reduction, and provides a reliable transport mechanism for data service traffic.

Figure 1:
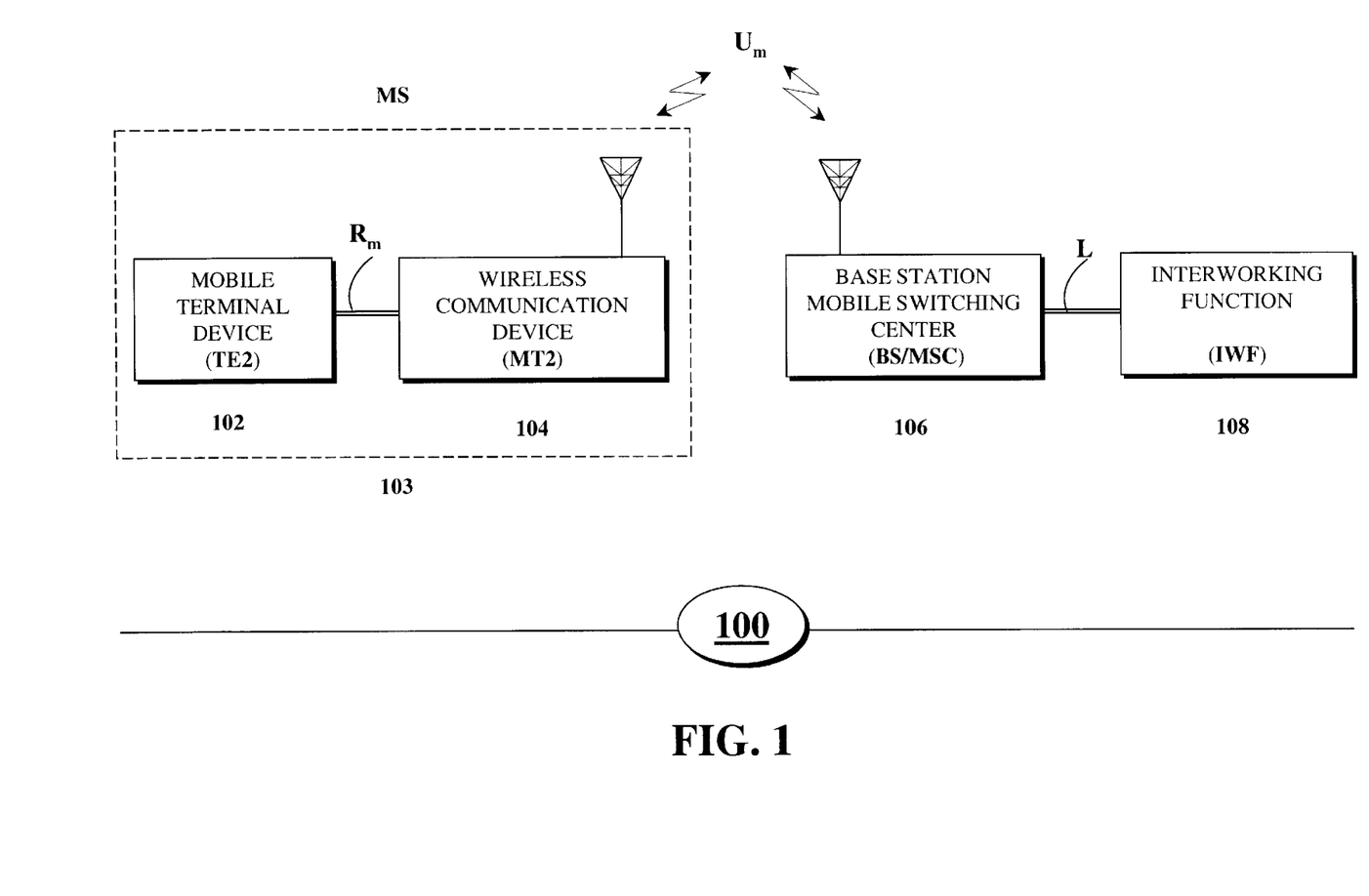
FIG. 1 is a high level block diagram depicting various elements of a wireless communication system.
Figure 2:
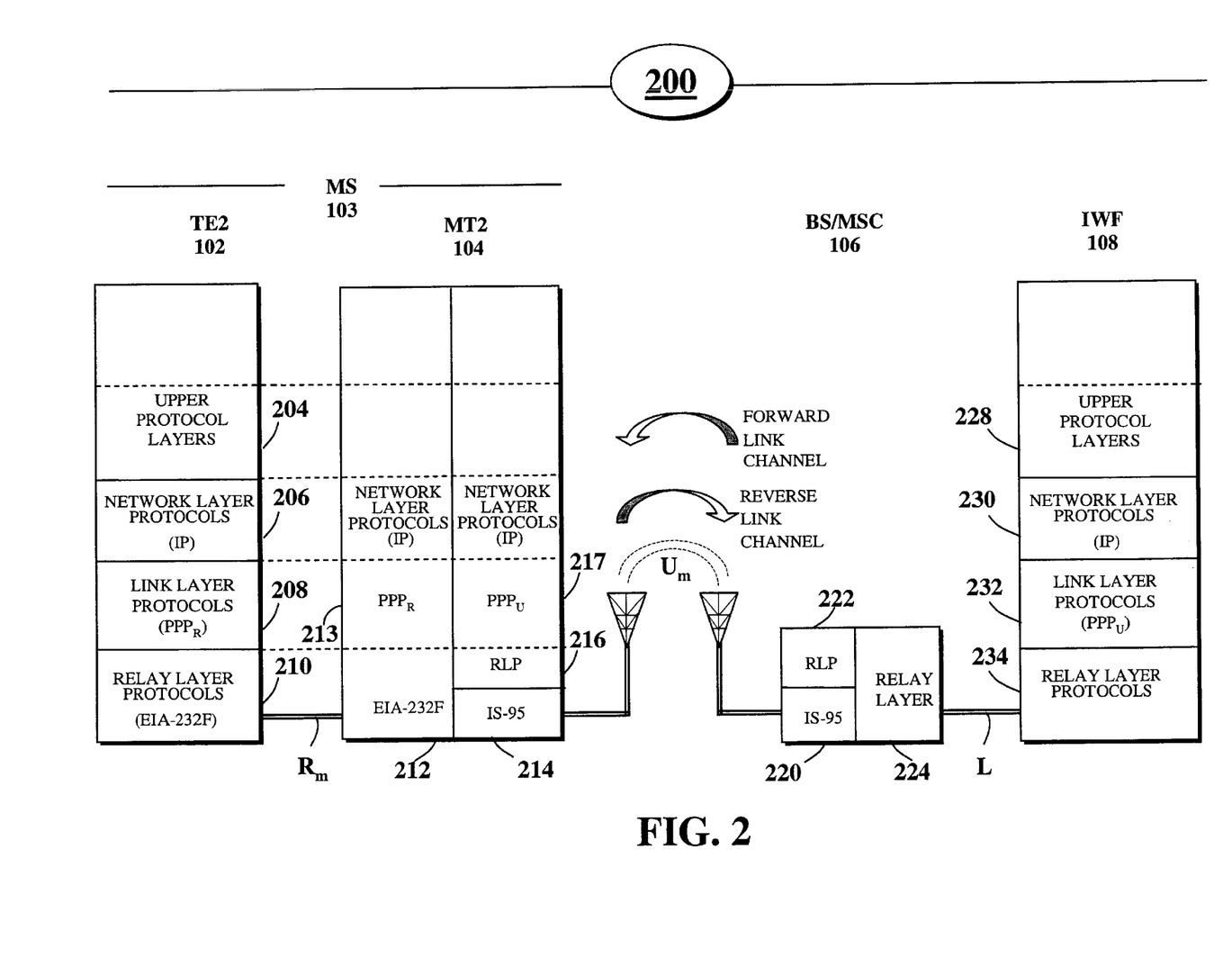
FIG. 2 schematically describes the protocol stacks of a wireless communication system.

FIG. 1 illustrates the basic elements of such a wireless data communication system 100. Practitioners will readily appreciate that these elements, and their interfaces, may be modified, augmented, or subjected to various standards known in the art, without limiting their scope or function. System 100 allows a mobile terminal equipment, TE2 device 102 (e.g., the terminal equipment such as laptop or palmtop computer) to communicate with a gateway entity, such as an Interworking Function (IWF) 108 or a Packet Data Serving Node (PSDN). The IWF 108 serves as a gateway between the wireless network and other networks, such as the Public Switched Telephone Network (PSTN) or wireline packet data networks providing Internet- or Intranet-based access. System 100 includes a wireless communication device, MT2 device 104 (e.g., wireless telephone), and a Base Station/Mobile Switching Center (BS/MSC) 106 or Radio Access Network (RAN). Often the IWF 108 will be co-located with the BS/MSC 106. An L interface may couple IWF 108 to BS/MSC 106. The TE2 device 102 is electronically coupled to the MT2 device 104 via the $R_m$ interface. The MT2 device 104 communicates with the BS/MSC 106 via the wireless interface $U_m$. The TE2 device 102 and the MT2 device 104 may be integrated into a single unit (e.g., MT0 device) or may be separated out, as in the case of an installed mobile phone unit in which a laptop is the TE2 device 102 and the transceiver is the MT2 device 104. It is important to note that, as indicated by FIG. 2, the combination of the TE2 device 102 and the MT2 device 104, whether integrated or separate, is generally referred to as a mobile station (MS) 103.

Other support is made possible by applying various well-known protocols to control, manage, or otherwise facilitate different aspects of wireless communications. For example, the life-blood of the Internet infrastructure, the Internet Protocol (IP), has been incorporated in many wireless communication services to accommodate packet-oriented services. The IP protocol specifies the addressing and routing of packets (datagrams) between host computers and is defined in Request For Comment 791 (RFC 791) entitled, "INTERNET PROTOCOL DARPA INTERNET PROGRAM PROTOCOL SPECIFICATION," published September 1981, and herein incorporated by reference.

The IP protocol is a network layer protocol that encapsulates data into IP packets for transmission. Addressing and routing information is affixed in the header of the packet. IP headers contain 32-bit addresses that identify the sending and receiving hosts. These addresses are used by intermediate routers to select a path through the network for the packet towards its ultimate destination at the intended address. Thus, the IP protocol allows packets originating at any Internet node in the world to be routed to any other Internet node in the world.

Another well-known protocol incorporated in wireless communications systems is the Point-to-Point Protocol (PPP) protocol, which provides, inter alia, Internet access. The PPP protocol is described in detail in Request for Comments 1661 (RFC 1661), entitled "THE POINT-TO-POINT PROTOCOL (PPP)", published July 1994 and herein incorporated by reference.

Essentially, the PPP protocol specifies a method for transporting multi-protocol datagrams over point-to-point links and contains three main components: a method of encapsulating multi-protocol datagrams; a Link Control Protocol (LCP) for establishing, configuring, and testing a data link connection; and a family of Network Control Protocols (NCPs) for establishing and configuring different network-layer protocols.

In an effort to provide a host of services on wireless communication systems, various standards have been developed to accommodate the wireless data transmission between the TE2 device 102 and the IWF 108. For example, the TIA/EIA IS-707.5 standard, entitled "DATA SERVICE OPTIONS FOR WIDEBAND SPREAD SPECTRUM SYSTEMS: PACKET DATA SERVICES," published February 1998, and herein incorporated by reference, defines requirements for support of packet data transmission capability on TIA/EIA IS-95 systems and specifies a suite of packet data bearer services. Similarly, the TIA/EIA IS-707-A.5 standard, entitled "DATA SERVICE OPTIONS FOR SPREAD SPECTRUM SYSTEMS: PACKET DATA SERVICES," and the TIA/EIA IS-707-A.9 standard, entitled "DATA SERVICE OPTIONS FOR SPREAD SPECTRUM SYSTEMS: HIGH-SPEED PACKET DATA SERVICES," both published in March 1999 and incorporated by reference, also define requirements for packet data transmission support on TIA/EIA IS-95 systems. In addition, new standards such as TIA/EIA IS-707-A-1 and A-2, entitled "DATA SERVICE OPTIONS FOR SPREAD SPECTRUM SYSTEMS: CDMA2000 HIGH-SPEED PACKET DATA SERVICES," (Ballot Resolution Version 1999) and incorporated by reference, also define requirements for packet data transmission support on CDMA systems.

In particular, the IS-707.5 standard provides certain packet data service modes that may be used to communicate between the TE2 device 102 and IWF 108 via BS/MSC 106. In doing so, IS-707.5 introduces the Network Model, which details the packet data protocol requirements for the $R_m$ and $U_m$ interfaces. The network model represents the situation where a first PPP link is set up between the TE2 device 102 and the MT2 device 104, and a second PPP link, independent of the first, is set up between the MT2 device 104 and the IWF 108. This model makes the MT2 device 104 responsible for unframing any received PPP packets and re-framing them before forwarding them to their final destination as well as providing mobility management and network address management.

FIG. 2 illustrates the protocol stacks 200 in each entity of the IS-707.5 Network Model. At the far left of FIG. 2 is a protocol stack, shown in conventional vertical format, depicting the protocol layers running on the TE2 device 102 (e.g., the mobile terminal, laptop or palmtop computer). The TE2 protocol stack is illustrated as being logically connected to the MT2 device 104 protocol stack over the $R_m$ interface. The MT2 device 104, is illustrated as being logically connected to the BS/MSC 106 protocol stack over the $U_m$ interface. The BS/MSC 106 protocol stack is, in turn, shown as being logically connected to the IWF 108 protocol stack over the L interface.

By way of example, the protocols depicted in FIG. 2, operate as follows: the PPP layer on the TE2 102 device associated with the $R_m$ interface (i.e., $PPP_R$ 208), encodes packets from the upper layer protocols 204, and the network layer IP protocol 206. The $PPP_R$ layer 208 then transmits the packets across the $R_m$ interface using an applicable protocol, such as, for example, the TIA/EIA 232-F protocol 210, and the packets are received by the TIA/EIA-232-F-compatible port on the MT2 device 104. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE", published in October 1997 and herein incorporated by reference. It is to be understood that other standards or protocols known to artisans of ordinary skill in the art may be used to define the transmission across the $R_m$ interface. For example, other applicable $R_m$ interface standards may include, the "UNIVERSAL SERIAL BUS (USB) SPECIFICATION, Revision 1.1", published in September 1998, and the "BLUETOOTH SPECIFICATION VERSION 1.0A CORE, published in July 1999, both incorporated by reference.

The TIA/EIA 232-F protocol 212 on the MT2 device 104 receives the packets from the TE2 device 102 and passes them to the $PPP_R$ layer 213 of the MT2 device 104. The $PPP_R$ layer 213 unframes the packets encapsulated in the PPP frames and typically, when a data connection is up, layer 213 transfers the packets to the PPP layer associated with the $U_m$ interface (i.e., $PPP_U$ layer 217). $PPP_U$ layer 217 formats the packets in PPP frames for transmission to a $PPP_U$ peer located in the IWF 108. The Radio Link Protocol (RLP) 216 and IS-95 protocol 214, both of which are well known in the art, are used to transmit the packet-encapsulated PPP frames to the BS/MSC 106 over the $U_m$ interface. The RLP protocol 216 is defined in the IS-707.2 standard, entitled "DATA SERVICE OPTIONS FOR WIDEBAND SPREAD SPECTRUM SYSTEMS: RADIO LINK PROTOCOL", published in February 1998 and herein incorporated by reference, and the IS-95 protocol is defined in the IS-95 standard identified above.

A corresponding RLP protocol 222 and IS-95 protocol 220 in the BS/MSC 106 transfer the packets to the relay layer protocol 234 for transmission across the L interface to the relay layer protocol 224 on the IWF 108. The $PPP_U$ layer 232 then unframes the received packets and transfers them to the network layer protocol IP 230, which in turn either passes them to the upper layer protocols 228 or forwards them to their final destination.

Under the IS-707.5 Network Model, the configuring, enabling, and disabling of the IP modules 206, 230 on both ends of the PPP link is provided by the Internet Protocol Control Protocol (IPCP). IPCP is a part of a family of network control protocols included in the PPP protocol and described in Request for Comment (RFC) 1332, "THE PPP INTERNET PROTOCOL CONTROL PROTOCOL (IPCP)", published in May 1992 and herein incorporated by reference.

IPCP utilizes configuration request messages to negotiate various configuration options. One such option is the IP Compression Protocol Option. When enabled, this option generally employs the Van Jacobson compression methodology for compressing the TCP/IP headers in a PPP packet. The Van Jacobson compression methodology improves the efficiency of a protocol by reducing the overhead in the packet headers and is described in RFC 1144 entitled, "COMPRESSING TCP/IP HEADERS FOR LOW-SPEED SERIAL LINKS", published in February 1990 and herein incorporated by reference. The Van Jacobson compression methodology is a compression algorithm that relies on knowledge of the fields in the TCP/IP headers to determine how they are likely to change from packet to packet. The negotiation of the IP Compression Protocol Option also requires the specification of maximum compression slot ID field, which determines the maximum number of compression and decompression slots for a particular PPP link and whether the connection ID can be compressed out.

The IPCP configuration option negotiations occur separately for both the $R_m$ interface and the $U_m$ interface. That is, the negotiation over the $R_m$ interface is separate from the negotiation the $U_m$ interface. The MT2 device 104 must, therefore, separately negotiate configuration options for the $PPP_R$ link over the $R_m$ interface and the $PPP_U$ link over the $U_m$ interface (see FIG. 2).

Due to the fact that the MT2 device 104 is mobile, it is possible that it may move to an area that is served by a different IWF 108. When this happens, a handoff will occur, handing the MT2 device 104 over to the new IWF 108 for service. When a handoff occurs, the $PPP_U$ link must be renegotiated over the $U_m$ interface, as discussed above. Because PPP negotiation for the $R_m$ and $U_m$ interfaces are independent, the renegotiation need only occur on the $U_m$ interface.

Of key import, however, is the renegotiation of the maximum number of $U_m$ interface compression slots in the reverse link direction (i.e., transmissions from the MT2 device 104 to the IWF 108, refer to FIG. 2). For example, when a call is initially brought up, the network model may attempt to optimize the negotiation process by trying to establish the same IPCP configuration options for the $U_m$ and $R_m$ interfaces in both the forward and reverse link directions. This includes instituting the same number of maximum compression slots for the $U_m$ and $R_m$ interfaces in both directions and the same ID compression status, so that a compressed packet generated by the TE2 device 102 and having a specific connection ID (i.e., compression slot ID) can be subsequently decompressed by the IWF 108. As such, this network model optimization enables the MT2 device 104 not to uncompress and recompress, that is, the compressed packet is passed through the MT2 without having any Van Jacobson compression algorithms applied to it.

However, if, due to the movement of the MT2 device 104, the $PPP_U$ link is renegotiated, there are no assurances that the maximum number of decompression slots that can be supported by the new IWF 108 will match the number of compression slots that were initially negotiated between on the TE2 device 102 and the MT2 device 104. It is, therefore, quite possible that after renegotiation, the maximum number of compression slots on the $U_m$ interface is less than the maximum number of compression slots on the $R_m$ interface. As such, the TE2 device 102 could transmit a compressed packet with a connection ID (i.e., compression slot ID) that is greater than what could be accommodated by the decompression slot with the highest ID on the IWF 108. In such cases, the compression slot will not be recognized by the IWF 108 and the packet will be discarded.

The mismatch between the maximum number of $R_m$ compression slots and $U_m$ decompression slots will, at best, decrease the transmission efficiency of the wireless communication system by forcing the uncompressed retransmission of all packets having compression slot IDs greater than the highest-numbered decompression slot ID. At worst, this mismatch will result in the loss of all packets having compression slot IDs greater than the highest-numbered decompression slot ID.

Therefore, what is needed is a novel method and system that selectively determines when to maintain a compression state and apply compression techniques on a wireless communication device in order to optimize the transmission efficiency of a wireless communication system.

SUMMARY OF THE INVENTION

The present invention addresses the need identified above by providing a method that determines when to maintain a compression state and apply compression techniques on a wireless communication device.

Methods consistent with the principles of the present invention as embodied and broadly described herein include a communication device for receiving packetized data transmitted from a terminal device which is coupled to the communication device via an $R_m$ interface. The communication device determines whether the received packetized data comprises compressed or uncompressed headers and then determines whether connection information identifying a compression slot is included in the compressed data in response to determining that the received packetized data comprises compressed data. The communication device further determines whether the connection information exceeds a highest-numbered decompression slot from a plurality of decompression slots on said $U_m$ interface. The communication device sets up a local decompression slot, in the communication device, which corresponds to the connection information in order to maintain said compression state, wherein the local decompression slot is set up in response to determining that the connection information exceeds the highest numbered decompression slot. The communication device decompresses the compressed packetized data when it receives compressed packetized data containing said connection information.

BRIEF DESCRIPTION OF THE DRAWINGS

The accompanying drawings, which are incorporated in and constitute a part of this Specification, illustrate an embodiment of the invention and, together with the description, explain the objects, advantages, and principles of the invention. In the drawings.

DETAILED DESCRIPTION OF THE PREFERRED EMBODIMENTS

The following detailed description of the embodiments of the present invention refers to the accompanying drawings that illustrate these. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that an embodiment of the present invention, as described below, may be realized in a variety of implementations, including the software, firmware, and hardware of the entities illustrated in the figures (i.e., TE2 device 102, MT2 device 104, BS/MSC 106 and IWF 108). The actual software code or control hardware used to implement the present invention is not limiting of the present invention. Thus, the operation and behavior of the present invention will be described without specific reference to the actual software code or hardware components. Such non-specific references are acceptable because it is clearly understood that a person of ordinary skill in the art would be able to design software and control hardware to implement the embodiment of the present invention based on the description herein.

1. First Embodiment

Figure 3A:
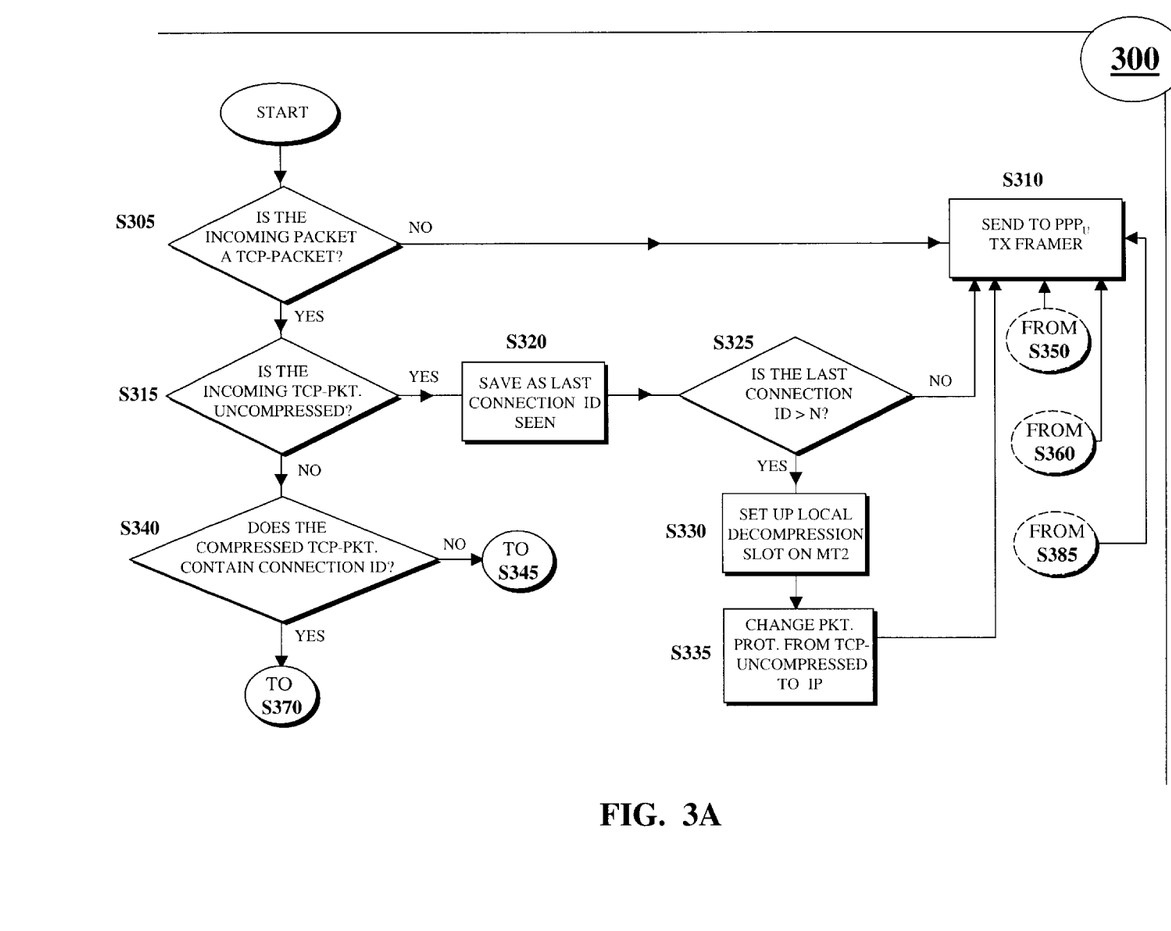
FIGS. 3A, 3B are flow-chart diagrams describing a first embodiment of the invention.
Figure 3B:
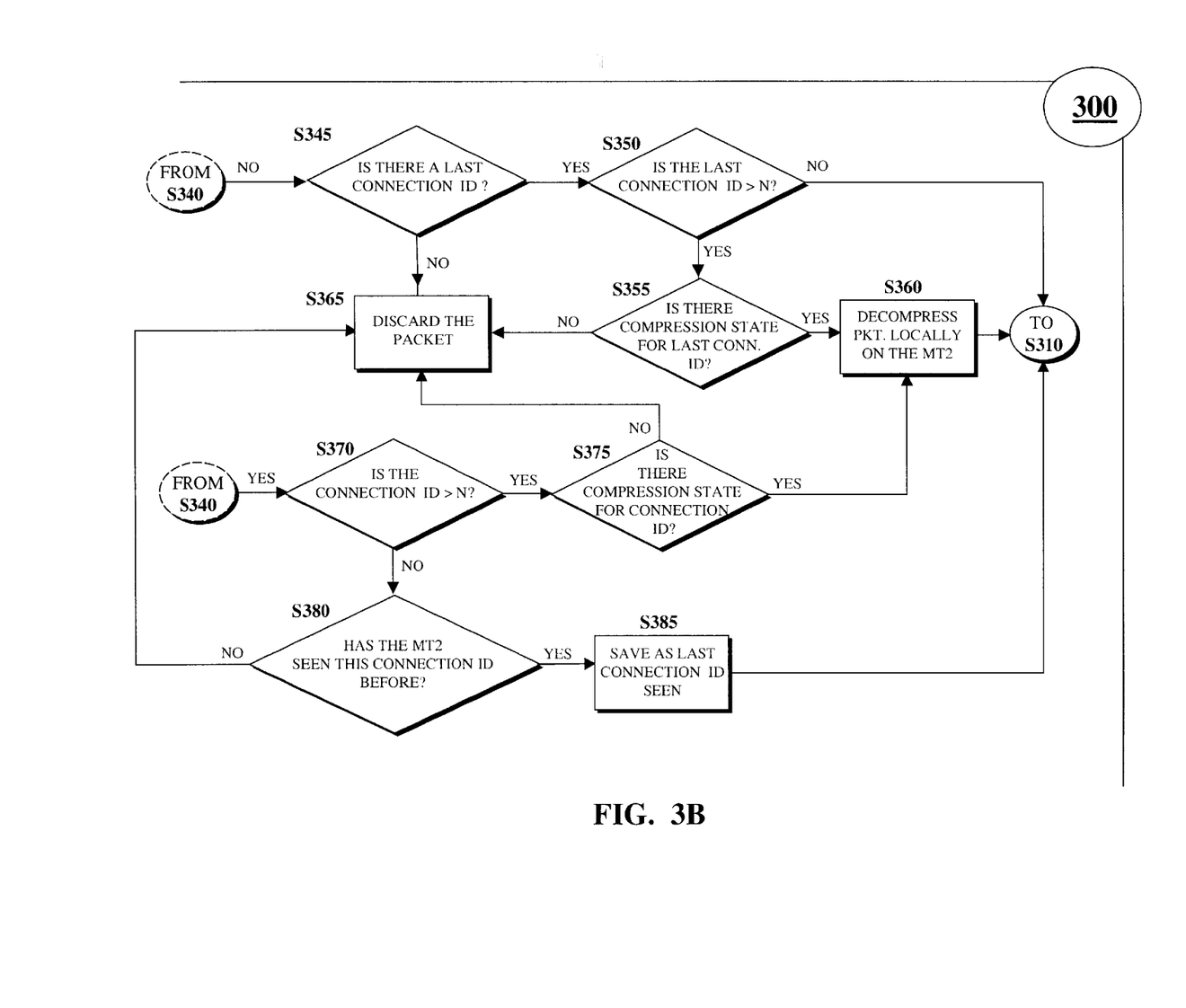

FIG. 3 is a flow-chart diagram depicting a first embodiment of the present invention. As such, FIG. 3 details the operation 300 of the MT2 device 104 for determining when to apply compression techniques.

When a packet arrives from the TE2 device 102, the MT2 device 104, in step S305, first determines whether the packet is a TCP packet. This is because the IP Compression Protocol Option, specifically the Van Jacobson compression technique, only operates on TCP-based packet headers. Therefore, if the incoming packet is not a TCP packet, it is routed to the $PPP_U$ framer on the MT2 device 104 prior to being transmitted to the $U_m$ interface, as indicated in step S310. If it is a TCP packet, the MT2 device 104, progresses to step S315.

In step S315, the MT2 device 104 determines whether the incoming packet is an uncompressed TCP packet. Generally, the arrival of an uncompressed TCP packet occurs during the initial stages of a connection to establish the compression state or to reset the compression state after packet retransmission. If the packet is an uncompressed TCP packet, the MT2 device 104 saves the connection ID and marks it as seen, as indicated in step S320. The MT2 device 104 then determines, in step S325, whether the connection ID is greater than N, where N is the maximum number of decompression slots on the $U_m$ interface (i.e., at the IWF 108). As part of the IPCP renegotiation process, the MT2 device 104 is aware of the maximum number of decompression slots that the IWF 108 can support. Therefore, if the packet contains a connection ID that is not greater than N, the IWF 108 has sufficient decompression slots to accommodate the connection ID, and the MT2 device 104 sends the packet to the $PPP_U$ framer for transmission, as in step S310. If, on the other hand, the packet connection ID is greater than N, the MT2 device 104, in step S330, sets up a local decompression slot within the MT2 device 104, so that packets with that particular connection ID can be decompressed by the MT2 device 104 prior to transmission, in order to be sent out as uncompressed packets. The decompression slot setup within the MT2 device 104 is feasible because the TCP packet is uncompressed, and can be used to establish the decompression states. In step S335, the MT2 device 104 changes the protocol field of the PPP packet to the IP protocol, and sends the packet to the $PPP_U$ framer of step S310. By changing the protocol field and transmitting the uncompressed packet, the MT2 device 104 ensures that the $U_m$ will not attempt to uncompress the packet and will simply forward the packet.

Returning to step S315, if the incoming packet is a compressed TCP packet (i.e., Van Jacobson compressed packet), the MT2 device 104 determines, in step S340, whether the packet contains connection ID. If the packet does not contain a connection ID, the MT2 device 104, in step S345, checks to see whether MT2 device 104 has saved a last connection ID. If it did not, the MT2 device 104 will discard the packet because it will not be recognized by the IWF 108, as indicated in step S365. If the MT2 device 104 did save a last connection ID, it determines, in step S350, whether the last connection ID is greater than N (i.e, the maximum number of decompression slots). If the last connection ID is not greater than N, the MT2 device 104 sends the packet to the $PPP_U$ framer for transmission, as in step S310. If the last connection ID is greater than N, the MT2 device 104 must then determine whether there exists compression state for the saved connection ID, as indicated in step S355. If there is no compression state, the MT2 device 104 discards the packet, as in step S365; if there is compression state, the MT2 device 104, in step S360, decompresses the header of the packet locally and sends the packet to the $PPP_U$ framer for transmission as an IP packet, as in step S310.

Returning to step S340, if the Van Jacobson-compressed packet contains a connection ID, the MT2 device 104 determines, in step S370, whether the connection ID is greater than N. If it is, the MT2 device 104 then determines, in step S375 whether there exists compression state for the connection ID, and if so, the MT2 device 104 decompresses the packet as per step S360 and sends the packet to the $PPP_u$ framer for transmission, as indicated in step S310. If in step, S370 the MT2 device 104 determines that the connection ID is not greater than N, the MT2 device 104 then checks, in step S380, whether it has seen this connection ID before. If the MT2 device 104 did not previously see that connection ID, it will discard the packet as indicated in step S365, because the packet will not be recognized by the IWF 108. If the MT2 device 104 has seen this connection ID before, it saves as last connection ID seen, as in step S385, and subsequently sends the packet to the $PPP_u$ framer for transmission, as indicated in step S310.

Thus, this embodiment incorporates decompression slots on the MT2 device 104 to decompress, by proxy, TCP packets with compression slot IDs that exceed the range of renegotiated decompression slots on the $U_m$ interface. As such, this embodiment provides a system and method that efficiently applies PPP header compression techniques, which minimizes the retransmission of packets having compression slot IDs greater than the highest-numbered decompression slot or the loss of such packets. In addition, this embodiment allows the MT2 device to avoid maintaining such a state while the number of slots is the same on both sides.

2. Second Embodiment

Figure 4A:
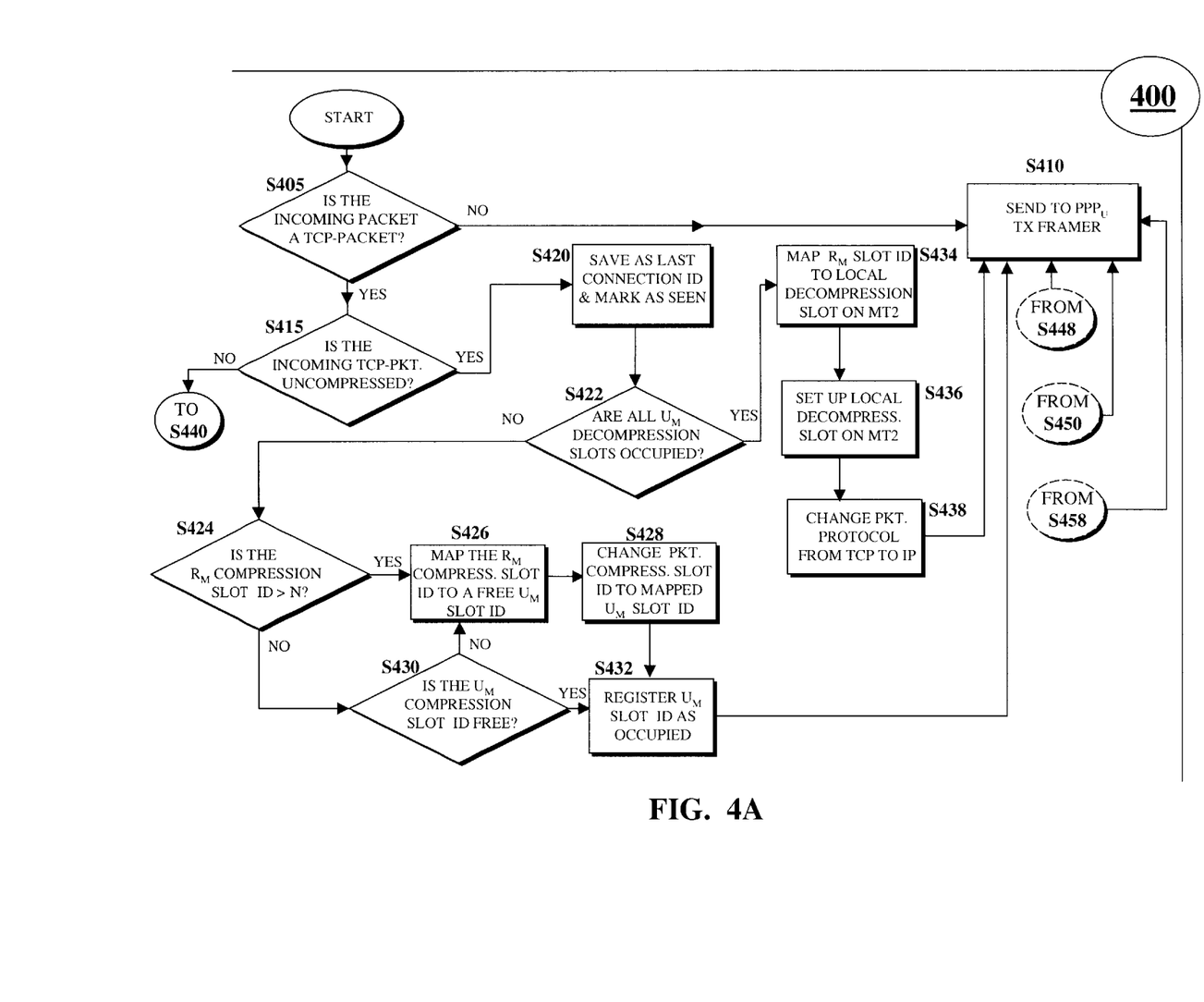
FIGS. 4A, 4B are flow-chart diagrams describing a second embodiment of the invention.
Figure 4B:
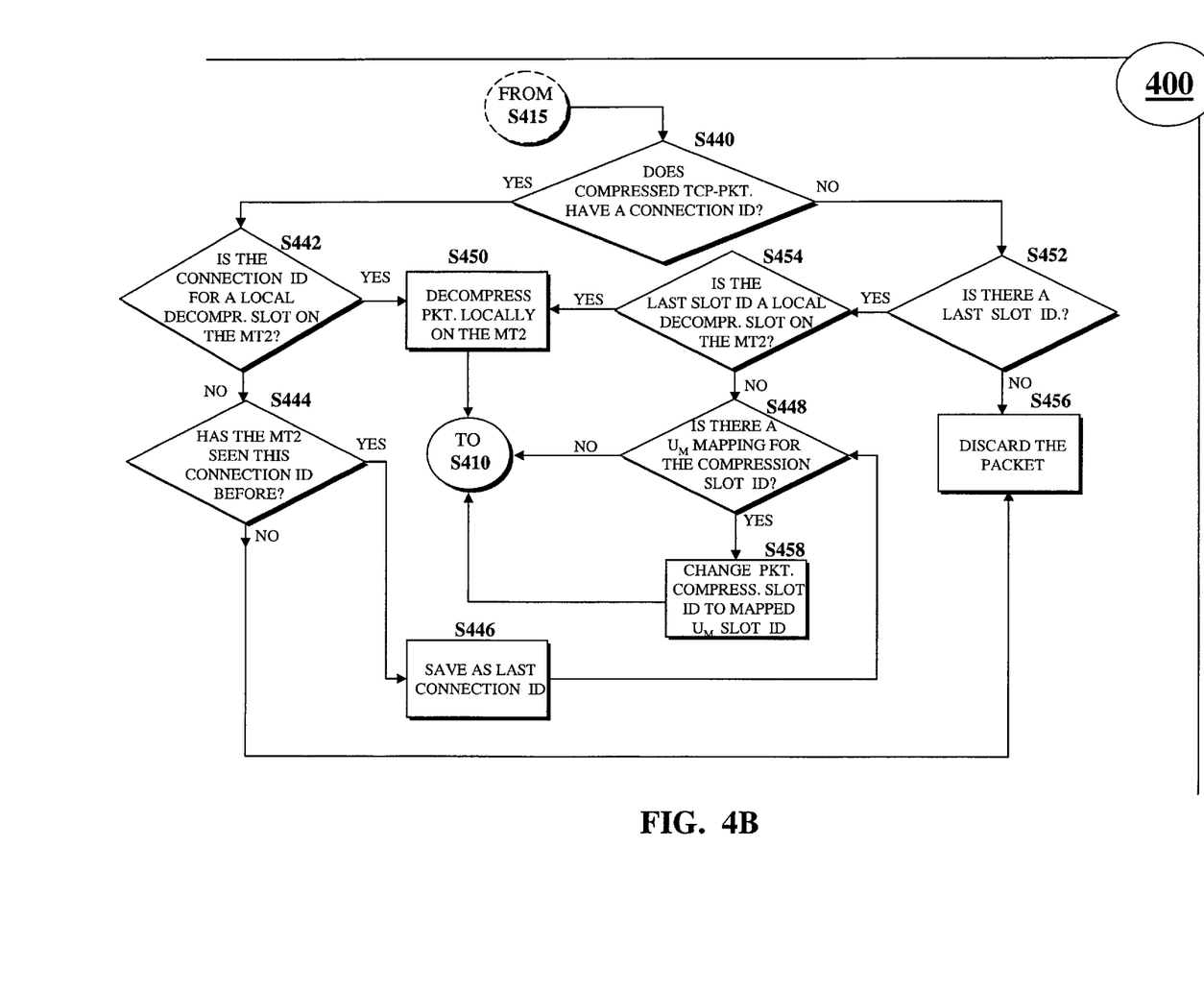

FIG. 4 is a flow-chart diagram 400 depicting a second embodiment of the present invention. As a packet arrives from the TE2 device 102, the MT2 device 104, in step S405, first determines whether the packet is a TCP-compliant packet. As stated above with respect to the first embodiment, this is because the Van Jacobson compression technique only operates on TCP/IP-based packet headers. Therefore, if the arriving packet is not a TCP packet, it is routed to the $PPP_U$ framer on the MT2 device 104 prior to being transmitted to the $U_m$ interface, as indicated in step S410. If the packet is a TCP packet, the MT2 device 104, progresses to step S415.

In step S415, the MT2 device 104 determines whether the incoming packet is an uncompressed TCP packet. As previously noted, the arrival of an uncompressed TCP packet occurs during the initialization stage or the reset packet stage. If the packet is an uncompressed TCP packet then the MT2 device 104 saves the connection ID as indicated in step S420.

In step S422, the MT2 device 104 determines whether all the $U_m$ interface decompression slots are occupied, and thus, unable to decompress any more connections. Unlike the first embodiment, which incorporates decompression slots on the MT2 device 104 to accommodate compression slot IDs that exceed the $U_m$ interface range of decompression slots, this embodiment first determines whether there exists any unoccupied $U_m$ interface decompression slots (i.e., slots on the IWF 108). If there exists unoccupied $U_m$ decompression slots, the MT2 device 104 maps the connection ID to one of the unoccupied $U_m$ interface decompression slots. This embodiment, therefore, only institutes local decompression slots on the MT2 device 104 if all the $U_m$ interface decompression slots are occupied.

Hence, if in step S422, the $U_m$ interface has not run out of slots, the MT2 device 104 then determines whether the packet's connection ID is greater than N, as indicated in step S424. If it is, the MT2 device 104, in step S426, maps the packet's connection ID to a free $U_m$ interface decompression slot in order to accommodate the subsequent decompression of the packet by the IWF 108. The MT2 device 104 then changes the packet's connection ID to the mapped $U_m$ decompression slot ID and registers that $U_m$ slot ID as being occupied, in steps S428 and S432, respectively. The MT2 device 104 subsequently routes the packet to the $PPP_U$ framer before transmitting the packet across the $U_m$ interface, as indicated in step S410.

If, in step S424, the packet's connection ID is not greater than N, the MT2 device 104 progresses to step S430, where it checks to see if that $U_m$ compression slot is available. If that slot is available, the MT2 device 104 registers the $U_m$ slot ID as being occupied and subsequently routes the packet to the $PPP_U$ framer, as indicated by steps S432 and S410, respectively. If that slot is not available, the MT2 device 104 progresses to step S426.

Returning to step S422, if the $U_m$ interface has run out of slots to accommodate the decompression of the packet with the compression slot ID, the MT2 device 104 advances to steps S434 and S436, where it respectively maps the compression slot ID from the $R_m$ interface to a local decompression slot ID and sets up the local decompression slot on the on the MT2 device 104. As stated above with respect to the first embodiment, the setup for the local decompression slot is feasible because the header information is exposed in the uncompressed TCP packet. In step S438, the MT2 device 104 changes the protocol field of the PPP packet to the IP protocol (as well as changes the protocol field in the IP header to the connection ID and calculates the IP header checksum) and then sends the packet to the $PPP_U$ framer of step S410. By changing the protocol field and transmitting the uncompressed IP packet, the MT2 device 104 ensures that the $U_m$ will not attempt to uncompress the packet and will simply forward the packet, in accordance with the IP protocol.

In an effort to save memory on the MT2 device 104, it may be desirable to restrict the number of local decompression slots. As such, an optimization technique may be employed to recycle the local decompression slot on the MT2 device 104. One such optimization technique is the "least recently used" algorithm whereby local decompression slots that are reserved for particular $R_m$ compression slot IDs, but are seldom used, are reclaimed and mapped to service other compression slot IDs. It is important to note that such a technique may impact the throughput of the reclaimed connection.

Returning to step S415, if the packet is a compressed TCP packet, the MT2 device 104 then progresses to step S440, where it determines whether the packet contains a connection ID. If so, the MT2 device 104 advances to step S442, where it checks to see whether the connection ID corresponds to a local decompression slot on the MT2 device 104. If the memory optimization techniques used in step S434 are employed (e.g., least recently used algorithm), the determination of step S442 may require checking existing mappings to investigate whether the ID corresponds to a local decompression slot.

If the decompression slot is local, the MT2 device 104, in step S450, decompresses the packet and routes the packet to the $PPP_U$ framer of step S410. If the decompression slot is not local, the MT2 device 104, in step S444, checks to see whether it has seen this connection ID before. If the MT2 device 104 has not seen this connection ID before, it discards the packet, in step S456, because it will not be recognized by the IWF 108. If, on the other hand, it has seen the connection ID before, the MT2 device 104, in step S446, saves the connection ID and then proceeds to check, in step S448, whether the connection ID has been mapped to a different decompression slot on the $U_m$ interface (see, for example, steps S426 and S428). If it has, the MT2 device 104 changes the connection ID to the mapped $U_m$ slot ID and subsequently routes the packet to the $PPP_U$ framer, as indicated by steps S458 and S410, respectively. If the connection ID has been not been mapped, the MT2 device 104 simply routes the packet to the $PPP_U$ framer of step S410.

Returning to step S440, if there does not exist a connection ID in the packet, the MT2 device 104 progresses to step S452, where it checks to see whether the it saved a value for the last connection ID. If the MT2 device 104 does not have such a value, it discards the packet, in step S456. If MT2 device 104 does have a value for the last connection ID, it determines, in step S454, whether this value corresponds to a local decompression slot on the MT2 device 104. If it does, the MT2 device 104, in step S450, decompresses the packet accordingly, and routes the packet to the $PPP_U$ framer of step S410. If the last connection ID does not correspond to a local decompression slot on the MT2 device 104, the MT2 device proceeds to step S448, where it checks to see whether the connection ID has been mapped to a different decompression slot on the $U_m$ interface (see, for example, steps S426 and S428). If it has, the MT2 device 104 changes the connection ID to the mapped $U_m$ slot ID and subsequently routes the packet to the $PPP_U$ framer, as indicated by steps S458 and S410, respectively. If the connection ID has been not been mapped, the MT2 device 104 simply routes the packet to the $PPP_U$ framer of step S410.

Thus, this embodiment first attempts to accommodate TCP packets with $R_m$ compression slot IDs that exceed $U_m$ interface decompression slots, by mapping such compression slots to an unoccupied $U_m$ decompression slot. If all $U_m$ decompression slots are occupied, this embodiment institutes local decompression slots on the MT2 device and even recycles these slots if needed, to decompress, by proxy, the TCP packets with the exceeding compression slot IDs. As such, this embodiment, provides a system and method that efficiently and intelligently applies PPP header compression techniques. By doing so, this embodiment minimizes the retransmission of packets having compression slot IDs greater than the highest-numbered decompression slot or the loss of such packets. In addition, this embodiment allows the MT2 device to avoid maintaining such a state while the number of slots is the same on both sides.

The processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by the system.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. Accordingly, the scope of the invention is defined by the claims and their equivalents.

What is claimed:

1. A method for maintaining a compression state and applying a compression technique after a PPP renegotiation on a $U_m$ interface of a wireless communication network, said method comprising:

receiving, in a communication device, packetized data transmitted from a terminal device, said terminal device coupled to said communication device via an $R_m$ interface;

ascertaining whether said received packetized data comprises compressed or uncompressed data;

determining, in response to ascertaining that said received packetized data comprises compressed data, whether connection information identifying a compression slot is included in said compressed data and whether said connection information exceeds a highest-numbered decompression slot from a plurality of decompression slots on said $U_m$ interface; and decompressing, in response to determining that said connection information is included in said compressed data and that it exceeds said highest-numbered decompression slot, said compressed packetized data in a local decompression slot configured in said communication device, when said communication device receives compressed packetized data containing said connection information.

2. The method of claim 1, wherein said compressed and uncompressed packetized data is formatted in accordance with TCP and Van Jacobson protocols.

3. The method of claim 2, wherein, in response to ascertaining that said received packetized data comprises uncompressed data, said communication device stores information identifying a compression slot included in uncompressed packetized data as last connection information, marks said last connection information as identifying information already seen, and establishes a local decompression slot in said communication device in response to determining that said last connection information exceeds said highest-numbered decompression slot.

4. The method of claim 3, wherein, in response to determining that said connection information is not included in said compressed data, said communication device determines whether said last connection information exists and whether said last connection information exceeds said highest-numbered decompression slot,
wherein said communication device discards said compressed packetized data when it determines that said last connection information does not exist, and
wherein, in response to determining that said last connection information exceeds said highest-numbered decompression slot, said communication device decompresses said compressed packetized data using said local decompression slot if there exists a compression state for said last connection information and said communication device discards said compressed packetized data if no compression state exists for said last connection information.

5. The method of claim 4, wherein, in response to determining that said connection information is included in said compressed data, said communication device determines whether said connection information exceeds said highest-numbered decompression slot,
wherein, in response to determining that said connection information exceeds said highest-numbered decompression slot, said communication device decompresses said compressed packetized data using said local decompression slot if there exists a compression state for said connection information and said communication device discards said compressed packetized data if no compression state exists for said connection information, and
wherein, in response to determining that said connection information does not exceed said highest-numbered decompression slot, said communication device discards said compressed packetized data if it has not previously seen said connection information and said communication device saves said connection information as last seen connection information if a compression state exists for said connection information.

6. A method for maintaining a compression state and applying a compression technique after a PPP renegotiation on a $U_m$ interface of a wireless communication network, said method comprising:
receiving, in a communication device, packetized data transmitted from a terminal device, said terminal device coupled to said communication device via an $R_m$ interface;
ascertaining whether said received packetized data comprises compressed or uncompressed data;
determining, in response to ascertaining that said received packetized data comprises compressed data, whether connection information identifying a compression slot is included in said compressed data and whether said connection information corresponds to a local decompression slot configured in said communication device; and
decompressing, in response to determining that said connection information is included in said compressed data and that said connection information corresponds to said local decompression slot, said compressed packetized data in said local decompression slot, when said communication device receives compressed packetized data containing said connection information.

7. The method of claim 6, wherein said compressed and uncompressed packetized data is formatted in accordance with TCP and Van Jacobson protocols.

8. The method of claim 7, wherein, in response to ascertaining that said received packetized data comprises uncompressed data, said communication device stores information identifying a compression slot included in uncompressed packetized data as last connection information, marks said last connection information as identifying information previously seen and determines whether all of a plurality of decompression slots on said $U_m$ interface are occupied.

9. The method of claim 8, wherein in response to determining that all of said plurality of decompression slots are occupied, said communication device maps connection information to said decompression slot and establishes a local decompression slot in said communication device.

10. The method of claim 9, wherein, in response to determining that at least one of said plurality of decompression slots on said $U_m$ interface is unoccupied, said communication device determines whether said connection information exceeds a highest-numbered decompression slot on said $U_m$ interface,
wherein, in response to determining that said connection information exceeds a highest-numbered decompression slot, said communication device maps said connection information to said at least one of unoccupied decompression slot on said $U_m$ interface, changes connection information to said mapped at least one of unoccupied decompression slot, and registers said mapped at least one of unoccupied decompression slot as occupied.

11. The method of claim 10, wherein, in response to determining that said connection information does not exceed a highest-numbered decompression slot, said communication device determines whether said decompression slot on said $U_m$ interface corresponding to said connection information is unoccupied,
wherein, said communication device registers said decompression slot on said $U_m$ interface as occupied if said decompression slot on said $U_m$ interface corresponding to said connection information is unoccupied and said communication device maps said connection information to said at least one of unoccupied decompression slot on said $U_m$ interface, changes connection information to said mapped at least one of unoccupied decompression slot, and registers said mapped at least one of unoccupied decompression slot as occupied if said decompression slot on said $U_m$ interface corresponding to said connection information is occupied.

12. The method of claim 11, wherein, in response to determining that said connection information is not included in said compressed data, said communication device determines whether there exists last connection information and whether said last connection information corresponds to said local decompression slot, wherein said communication device discards said compressed packetized data when no last connection information exists, wherein, in response to determining that said last connection information corresponds to said local decompression slot, said communication device decompresses said compressed packetized data using said local decompression slot, and wherein, in response to determining that said last connection information does not correspond to said local decompression slot, said communication device changes compression information of said packetized data to said mapped decompression slot on said $U_m$ interface if said communication device determines that said mapped decompression slot on said $U_m$ interface exist.

13. A machine-readable medium encoded with a plurality of processor-executable instruction sequences for maintaining a compression state and applying a compression technique after a PPP renegotiation on a $U_m$ interface of a wireless communication network, said instruction sequences comprising:

receiving, in a communication device, packetized data transmitted from a terminal device, said terminal device coupled to said communication device via an $R_m$ interface;

ascertaining whether said received packetized data comprises compressed or uncompressed data;

determining, in response to ascertaining that said received packetized data comprises compressed data, whether connection information identifying a compression slot is included in said compressed data and whether said connection information exceeds a highest-numbered decompression slot from a plurality of decompression slots on said $U_m$ interface; and decompressing, in response to determining that said connection information is included in said compressed data and that it exceeds said highest-numbered decompression slot, said compressed packetized data in a local decompression slot configured in said communication device, when said communication device receives compressed packetized data containing said connection information.

14. The machine-readable medium of claim 13, wherein said compressed and uncompressed packetized data is formatted in accordance with TCP and Van Jacobson protocols.

15. The machine-readable medium of claim 14, wherein, in response to ascertaining that said received packetized data comprises uncompressed data, said communication device stores information identifying a compression slot included in uncompressed packetized data as last connection information, marks said last connection information as identifying information already seen, and establishes a local decompression slot in said communication device in response to determining that said last connection information exceeds said highest-numbered decompression slot.

16. The machine-readable medium of claim 15, wherein, in response to determining that said connection information is not included in said compressed data, said communication device determines whether said last connection information exists and whether said last connection information exceeds said highest-numbered decompression slot, wherein said communication device discards said compressed packetized data when it determines that said last connection information does not exist, and wherein, in response to determining that said last connection information exceeds said highest-numbered decompression slot, said communication device decompresses said compressed packetized data using said local decompression slot if there exists a compression state for said last connection information and said communication device discards said compressed packetized data if no compression state exists for said last connection information.

17. The machine-readable medium of claim 16, wherein, in response to determining that said connection information is included in said compressed data, said communication device determines whether said connection information exceeds said highest-numbered decompression slot, wherein, in response to determining that said connection information exceeds said highest-numbered decompression slot, said communication device decompresses said compressed packetized data using said local decompression slot if there exists a compression state for said connection information and said communication device discards said compressed packetized data if no compression state exists for said connection information, and wherein, in response to determining that said connection information does not exceed said highest-numbered decompression slot, said communication device discards said compressed packetized data if it has not previously seen said connection information and said communication device saves said connection information as last seen connection information if a compression state exists for said connection information.

18. A machine-readable medium encoded with a plurality of processor-executable instruction sequences for maintaining a compression state and applying a compression technique after a PPP renegotiation on a $U_m$ interface of a wireless communication network, said instruction sequences comprising:

receiving, in a communication device, packetized data transmitted from a terminal device, said terminal device coupled to said communication device via an $R_m$ interface;

ascertaining whether said received packetized data comprises compressed or uncompressed data;

determining, in response to ascertaining that said received packetized data comprises compressed data, whether connection information identifying a compression slot is included in said compressed data and whether said connection information corresponds to a local decompression slot configured in said communication device; and decompressing, in response to determining that said connection information is included in said compressed data and that said connection information corresponds to said local decompression slot, said compressed packetized data in said local decompression slot, when said communication device receives compressed packetized data containing said connection information.

19. The machine-readable medium of claim 6, wherein said compressed and uncompressed packetized data is formatted in accordance with TCP and Van Jacobson protocols.

20. The machine-readable medium of claim 19, wherein, in response to ascertaining that said received packetized data comprises uncompressed data, said communication device stores information identifying a compression slot included in uncompressed packetized data as last connection information, marks said last connection information as identifying information previously seen and determines whether all of a plurality of decompression slots on said $U_m$ interface are occupied.

21. The machine-readable medium of claim 20, wherein in response to determining that all of said plurality of decompression slots are occupied, said communication device maps connection information to said decompression slot and establishes a local decompression slot in said communication device.

22. The machine-readable medium of claim 21, wherein, in response to determining that at least one of said plurality of decompression slots on said $U_m$ interface is unoccupied, said communication device determines whether said connection information exceeds a highest-numbered decompression slot on said $U_m$ interface, wherein, in response to determining that said connection information exceeds a highest-numbered decompression slot, said communication device maps said connection information to said at least one of unoccupied decompression slot on said $U_m$ interface, changes connection information to said mapped at least one of unoccupied decompression slot, and registers said mapped at least one of unoccupied decompression slot as occupied.

23. The machine-readable medium of claim 22, wherein, in response to determining that said connection information does not exceed a highest-numbered decompression slot, said communication device determines whether said decompression slot on said $U_m$ interface corresponding to said connection information is unoccupied, wherein, said communication device registers said decompression slot on said $U_m$ interface as occupied if said decompression slot on said $U_m$ interface corresponding to said connection information is unoccupied and said communication device maps said connection information to said at least one of unoccupied decompression slot on said $U_m$ interface, changes connection information to said mapped at least one of unoccupied decompression slot, and registers said mapped at least one of unoccupied decompression slot as occupied if said decompression slot on said $U_m$ interface corresponding to said connection information is occupied.

24. The machine-readable medium of claim 23, wherein, in response to determining that said connection information is not included in said compressed data, said communication device determines whether there exists last connection information and whether said last connection information corresponds to said local decompression slot, wherein said communication device discards said compressed packetized data when no last connection information exists, wherein, in response to determining that said last connection information corresponds to said local decompression slot, said communication device decompresses said compressed packetized data using said local decompression slot, and wherein, in response to determining that said last connection information does not correspond to said local decompression slot, said communication device changes compression information of said packetized data to said mapped decompression slot on said $U_m$ interface if said communication device determines that said mapped decompression slot on said $U_m$ interface exist.

* * * * *